US007302396B1

(12) United States Patent
Cooke

(10) Patent No.: US 7,302,396 B1
(45) Date of Patent: Nov. 27, 2007

(54) SYSTEM AND METHOD FOR CROSS-FADING BETWEEN AUDIO STREAMS

(75) Inventor: Kenneth E. Cooke, Seattle, WA (US)

(73) Assignee: RealNetworks, Inc., Seattle, WA (US)

(*) Notice: Subject to any disclaimer, the term of this patent is extended or adjusted under 35 U.S.C. 154(b) by 0 days.

(21) Appl. No.: 09/300,798

(22) Filed: Apr. 27, 1999

(51) Int. Cl.
G10L 19/00 (2006.01)
(52) U.S. Cl. ...................... 704/500; 714/746
(58) Field of Classification Search ............... 704/500, 704/503, 270, 201; 375/316, 355; 714/747
See application file for complete search history.

(56) References Cited

U.S. PATENT DOCUMENTS

| 4,644,400 | A |   | 2/1987  | Kouyama et al. |
|-----------|---|---|---------|----------------|
| 4,726,067 | A |   | 2/1988  | Alonso |
| 5,177,801 | A | * | 1/1993  | Shoda ................. 381/119 |
| 5,386,493 | A |   | 1/1995  | Degen et al. |
| 5,479,564 | A |   | 12/1995 | Vogten et al. |
| 5,526,353 | A |   | 6/1996  | Henley et al. |
| 5,611,002 | A |   | 3/1997  | Vogten et al. |
| 5,642,171 | A |   | 6/1997  | Baumgartner et al. |
| 5,664,226 | A |   | 9/1997  | Czako et al. |
| 5,692,213 | A |   | 11/1997 | Goldberg et al. |
| 5,694,521 | A |   | 12/1997 | Shlomot et al. |

(Continued)

OTHER PUBLICATIONS

P. Venkat Rangan, et al., *Continuity and Synchronization in MPEG*, IEEE, Jan. 1996.

(Continued)

Primary Examiner—Angela A. Armstrong
(74) Attorney, Agent, or Firm—Axios Law Group; Adam L. K. Philipp

(57) ABSTRACT

A system and method of the present invention cross-fade a first transmitted audio stream to a second transmitted audio stream, wherein both first and second audio streams represent the same original audio signal, but at different quality levels. A client computer receives timestamped packets of compressed encoded audio data from the first audio stream, decodes that data and resamples it to a highest sampling rate supported by playback equipment such as a sound card. A server computer responds to a change in available bandwidth, by transmitting timestamped packets of the second audio stream which correspond to a playback time earlier than that of the final transmitted packet of the first audio stream. The client computer buffers in a first buffer the decoded resampled samples from the final packets of the first audio stream, which represent a playback time period $t_1$. The client computer then buffers in a second buffer decoded resampled samples from the initial packets of the second audio stream representing a playback time period $t_2$. A cross-fade overlap window is defined by a time period $t_3$ over which $t_1$ and $t_2$ overlap. A cross-fader cross-fades sample pairs drawn from both buffers, each pair corresponding to a playback time in the cross-fade overlap window. A cross-fade table holds a predetermined number of values decreasing from 1 to 0, which values approximate a cross-fade curve. The cross-fader applies a weight value to each sample pair, the weight value calculated by applying linear interpolation across adjacent values in the cross-fade table, by multiplying a sample from the first audio stream by the weight value, and by multiplying a time-corresponding sample from the second audio stream by one minus the weight value. The resulting contributions from both samples are combined and sent to audio reproduction equipment.

27 Claims, 11 Drawing Sheets

U.S. PATENT DOCUMENTS

| | | | |
|---|---|---|---|
| 5,768,126 A * | 6/1998 | Frederick | 700/94 |
| 5,777,612 A | 7/1998 | Kataoka | |
| 5,822,537 A | 10/1998 | Katseff et al. | |
| 5,832,442 A | 11/1998 | Lin et al. | |
| 5,842,172 A | 11/1998 | Wilson | |
| 5,844,600 A | 12/1998 | Kerr | |
| 5,864,678 A | 1/1999 | Riddle | |
| 5,893,062 A * | 4/1999 | Bhadkamkar et al. | 704/270 |
| 5,943,347 A * | 8/1999 | Shepard | 714/747 |
| 5,952,596 A * | 9/1999 | Kondo | 84/605 |
| 6,049,766 A * | 4/2000 | Laroche | 704/216 |

OTHER PUBLICATIONS

Hiroshi Kit Amura, *New Algorithms and Techniques for Well-Synchronized Audio and Video Streams Communications*, IEEE, 1997.

Marc H. Willebeek-LeMair, et al., *Videoconferencing over Packet-Based Networks*, IEEE, 1997.

Benjamin W. Wah and Dong Lin, *Transformation-based Reconstruction for Audio Transmissions over the Internet*, IEEE, 1998.

Norm Hurst and Katie Cornog, *MPEG Splicing: A New Standard for Television—SMPTE 312M*, STMPTE Journal, Nov. 1998.

* cited by examiner

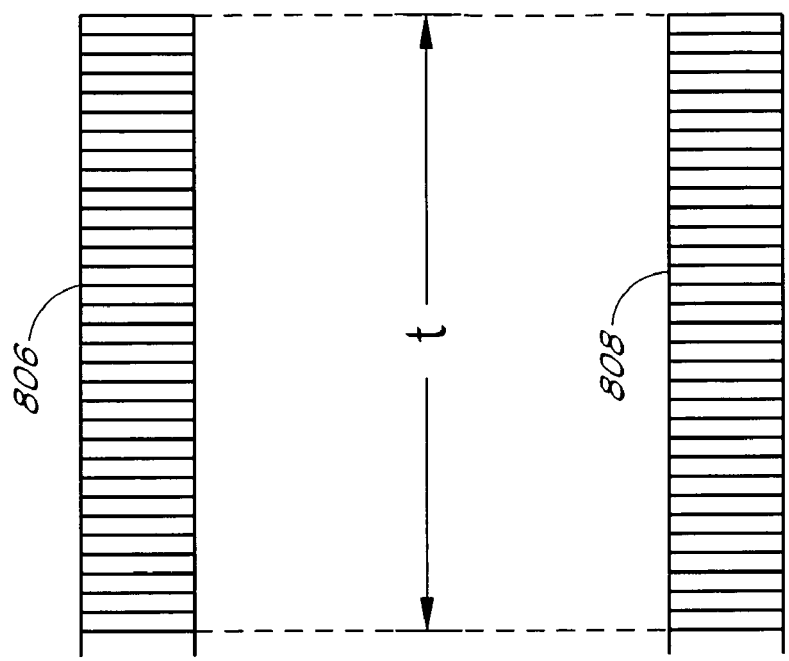
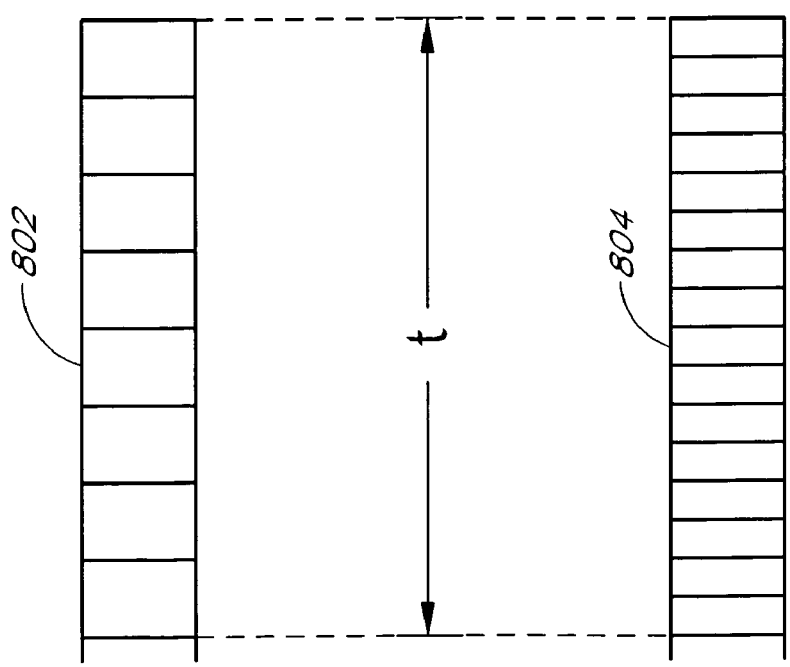
FIG. 8

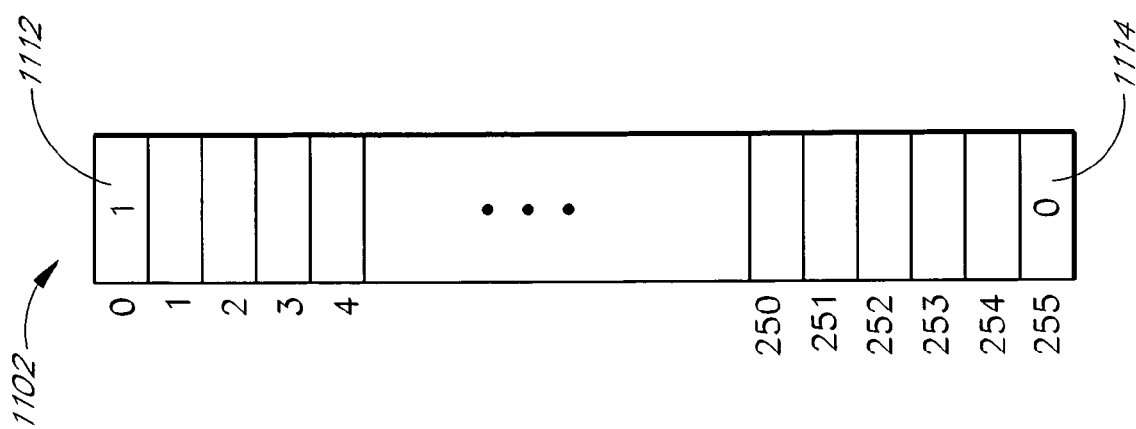
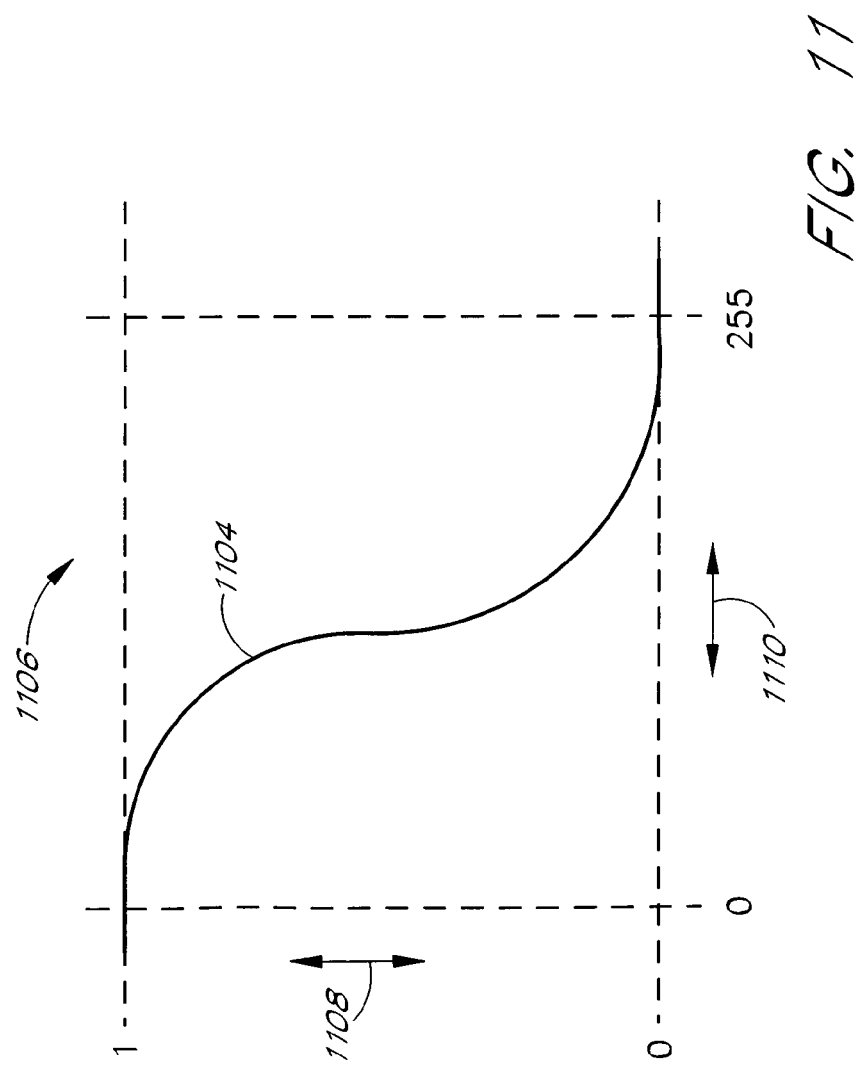
FIG. 11

SYSTEM AND METHOD FOR CROSS-FADING BETWEEN AUDIO STREAMS

BACKGROUND OF THE INVENTION

1. Field of the Invention

This invention relates to the processing of audio data. More specifically, the invention provides a system and method for cross-fading between audio streams having different sampling rates.

2. Description of the Related Art

Using digital data to represent high-quality audio signals is well known, as is transmitting the digital data representing those audio signals over communication networks. However, the number and type of communication links is growing rapidly, and the available bandwidth over these communication links is not always stable.

As one example, broadcasters now use the Internet more frequently than ever for transmitting digital audio data. Yet, because of the wide variety of equipment, much of which is aging or otherwise susceptible to intermittent or permanent failure or partial incompatibility, and also because of the dynamic, dramatic, and continuing shifts in the traffic of data routing through the Internet at any one time, the bandwidth available for any one communication link is always subject to unexpected decreases or increases.

Some advances have been made in maximizing the quality of an audio transmission over communication channels of varying bandwidths. For example, some audio broadcast systems now permit an audio data serving system to select from two or more representations of the same audio signal, selecting the one best suited for the available bandwidth.

Current systems, however, do not overcome the pops, clicks, glitches, and other annoying disruptions that occur when, during the transmission of one audio clip, the audio serving system abruptly switches to a different representation of the same audio clip more appropriate given a perceived change in the available bandwidth of the communication link. What is needed, is a system and method which allows an audio receiving system to continuously receive the highest possible quality of audio data that the communication link can support without annoying disruptions, glitches, pops, crackles or the like, coincident with changes between audio signals of different quality.

SUMMARY OF THE INVENTION

In one embodiment, the present invention is a method for cross-fading audio streams. The method comprises the steps of: (1) receiving first audio data from a first audio stream; (2) receiving second audio data from a second audio stream; (3) normalizing in sampling rate a portion of the first audio data which overlaps in time with the second audio data to generate first samples; (4) normalizing in sampling rate a portion of the second audio data which overlaps in time with the first audio data to generate second samples; and (5) cross-fading pairs of samples, each pair substantially corresponding to a playback time, one sample of each pair from the first samples, the other sample of each pair from the second samples. One aspect of the method is one wherein the cross-fading includes applying a first cross-fade weight to a first sample of each of the pair of samples to obtain a first contribution, applying a second cross-fade weight to a second sample of each of the pair of samples to obtain a second contribution, and combining the first and second contributions to generate a cross-fade sample.

Another embodiment of the present invention is a method for cross-fading between first and second received audio streams representing the same original audio signal. The method comprises the steps of: (1) receiving in a receive buffer first audio data representing a time period $t_1$ of the original audio signal, the first audio data from the first audio stream; (2) decoding the first audio data to generate first audio samples; (3) resampling the first audio samples in accordance with a target sampling rate to generate first resampled audio samples; (4) receiving in the receive buffer second audio data representing a time period $t_2$ of the original audio signal, the second audio data from the second audio stream, the time period $t_2$ overlapping in a time period $t_3$ the time period $t_1$; (5) decoding the second audio data to generate second audio samples; (6) resampling the second audio samples in accordance with the target sampling rate to generate second resampled audio samples, each of the second resampled audio samples substantially corresponding in time to a respective one of the first resampled audio samples to form a sample pair; and (7) cross-fading each sample pair corresponding to a time within the time period $t_3$, by applying a first cross-fade weight to a first sample of the sample pair to obtain a first contribution, by applying a second cross-fade weight to a second sample of the sample pair to obtain a second contribution, and by combining the first and second contributions. One aspect of the method is one wherein the first audio stream represents the original audio signal at a first sampling rate and the second audio stream represents the original audio signal at a second sampling rate. Another aspect of the method is one wherein each applied first cross-fade weight represents a value between 1 and 0, and the sum of the first cross-fade weight and the second cross-fade weight applied to each the sample pair is 1.

Still another embodiment of the present invention is a system for cross-fading between first and second received audio streams representing an original audio signal. The system comprises: (1) a receive buffer storing received audio stream data; (2) a decoder decoding audio stream data from the receive buffer into digital samples; (3) a sample-rate converter resampling the digital samples in accordance with a target sampling rate; and (4) a cross-fader responsive to a cross-fade signal to cross-fade first resampled digital samples from the first audio stream with resampled digital samples from the second audio stream overlapping in time with the first digital samples. One aspect of the system is one wherein the cross-fader applies cross-fade weights to paired resampled samples from the first and second audio streams to generate cross-faded samples, each of the pairs of resampled samples substantially corresponding to a playback time. Another aspect of the system is one wherein the cross-fader applies a first cross-fade weight to a first of each pair of the resampled samples and applies a second cross-fade weight to a second of each pair of the resampled samples, the first and second cross-fade weights summing to one.

A still further embodiment of the present invention is a system for cross-fading audio data. The system comprises: (1) means for receiving transmitted audio data; (2) means for decoding audio data from two different audio streams; (3) means for resampling audio data from two different audio streams to a common sampling rate, the audio streams encoded at different sampling rates; and (4) means for cross-fading resampled audio data from first and second portions two different audio streams, the audio data overlapping in time, the two different audio streams representing the same original audio signal.

BRIEF DESCRIPTION OF THE DRAWINGS

FIG. 8 illustrates data samples from a first audio stream and data samples from a second audio stream prior to resampling;

FIG. 11 illustrates a cross-fade table providing an approximation of points along a curve derived from a cross-fade function.

DETAILED DESCRIPTION OF THE PREFERRED EMBODIMENT

Figure 1:
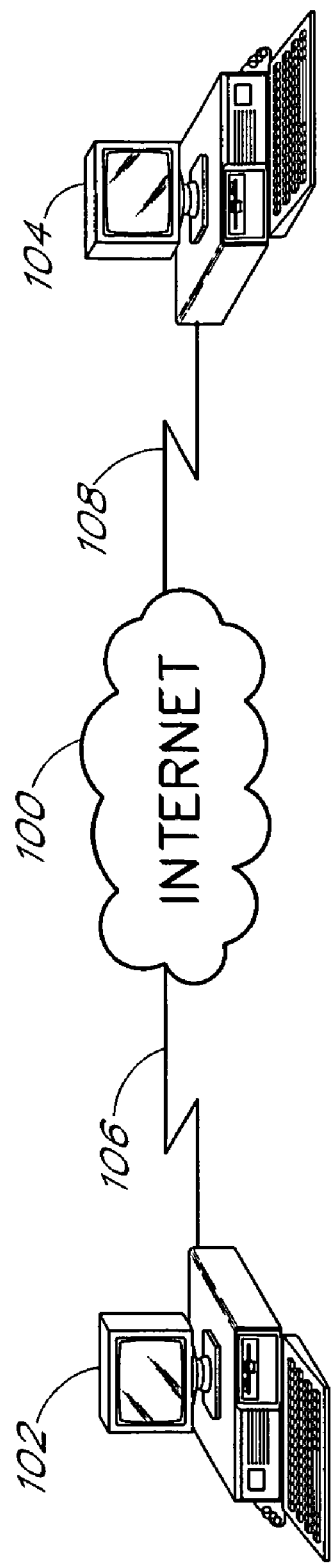
FIG. 1 illustrates a high level diagram of an audio transmission system supporting a cross fade operation.

FIG. 1 illustrates a high level diagram of an audio transmission system supporting a cross fade operation. The system includes a network 100, a server computer 102, and a client computer 104. The server computer 102 and the client computer 104 are connected to the network 100 via communication links 106, 108.

The server computer 102 and the client computer 104 may each be any conventional general purpose computer using one or more microprocessors, such as a Pentium processor, a Pentium II processor, a Pentium Pro processor, a Pentium III processor, an xx86 processor, an 8051 processor, a MIPS processor, a Power PC processor, or an ALPHA processor. Note that the server computer 102 and the client computer 104 could be one of a number of different types of computing devices, including a desktop, portable or hand-held computer, or a network computer.

The server computer 102 and the client computer 104 preferably include computer-readable storage media, such as standard hard disk drives and/or around 8 MB of RAM (random access memory) or more. The server computer 102 and the client computer 104 each also comprise a data communication device, such as, for example, a 56 kbps modem or network interface card.

The network 100 may include any type of electronically connected group of computers including, for example, the following networks: Internet, intranet, local area networks (LAN) or wide area networks (WAN). In addition, the connectivity to the network may be, for example, ethernet (IEE 802.3), token ring (IEEE802.5), fiber distributed data link interface (FDDI) or asynchronise transfer mode (ATM). The network 100 can include any communication link between two computers. As used herein, an Internet includes network variations such as public Internet, a private Internet, a secure Internet, a private network, a public network, a value-added network, and the like.

Figure 2:
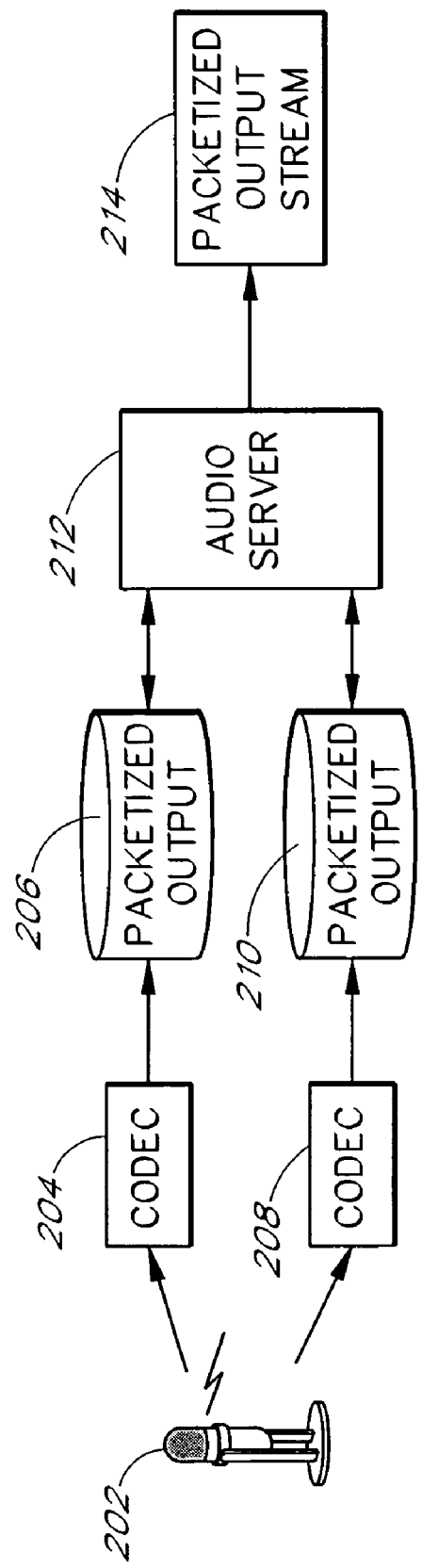
FIG. 2 illustrates components of a server computer for generating, storing and transmitting digital audio data.

FIG. 2 illustrates components of the server computer 102 for generating, storing and transmitting digital audio data. An analog audio signal 202 may or may not be generated by a component of the server computer 102, but is presented on a bus (not shown) or line of the server computer 102.

A first codec (coder/decoder) module 204 receives the audio signal 202. In one embodiment, an analog to digital converter module (not shown) of the codec 204 samples the audio signal 202 at a first sampling rate, such as 8 kHz. As used herein, the word module refers to logic embodied in hardware or firmware, or to a collection of software instructions, possibly having entry and exit points, written in a programming language, such as, for example, C++. A software module may be compiled and linked into an executable program, or installed in a dynamic link library, or may be written in an interpretive language such as BASIC. It will be appreciated that software modules may be callable from other modules, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays. The modules described herein are preferably implemented as software modules, but could be represented in hardware or firmware.

A subband or transform coder module (not shown) of the codec 204 generates digital sample data representing signal characteristics in discrete frequency components of the audio signal 202. The digital sample data are represented in a 16-bit PCM (pulse code modulated) format. It will be appreciated by those of ordinary skill in the art that it is known to represent high-quality audio data signals in such a format.

In a preferred embodiment, the codec 204 compresses the 16-bit PCM data samples. As one example, the codec 204 uses a quantization-based compression technique, followed by entropy or run-length encoding. These and other types of compression techniques are well known, and the present invention is not limited by a compression technique.

An audio data packetizer (not shown), which may or may not be a module integral to the codec 204, organizes the compressed sample data into packets to collectively form packetized output 206. In a preferred embodiment, the packetized output is stored on computer-readable media accessible by the server computer 102. The audio data packetizer additionally stores information about the encoding parameters, such as the sampling rate and begin and end absolute times, in a header portion of the packetized output.

Figure 3:
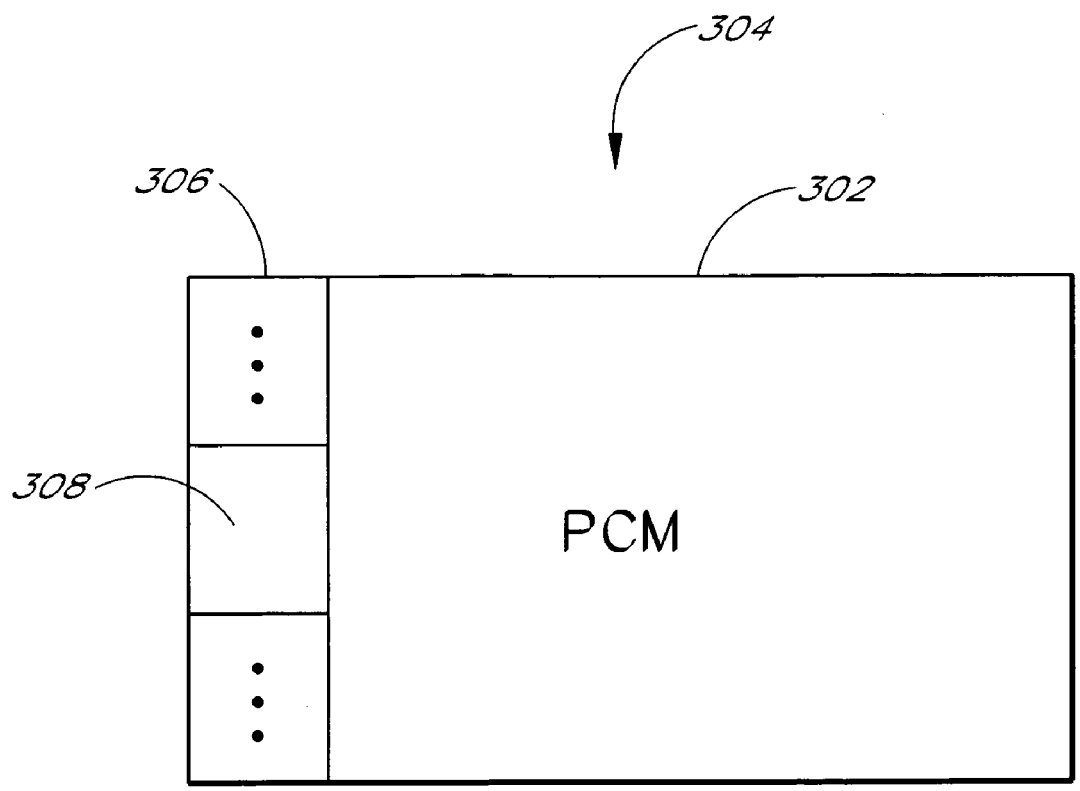
FIG. 3 illustrates a representation of an audio packet in accordance with one embodiment of the present invention.

FIG. 3 illustrates a representation of an audio packet in accordance with one embodiment of the present invention. A body portion 302 of the packet includes compressed encoded data samples. A header portion 306 of the packet 304 concludes a timestamp 308. The timestamp 308 generally indicates a time value at which the sound signals represented in the packet 304 are to be played in relation to the entire audio clip of which it is a part. Thus, in a preferred embodiment, the timestamp 308 represents a time offset from the beginning of the audio clip until the time at which the first audio sample in the packet 304 is to be played to reconstruct the audio clip. In one embodiment, the timestamp is accurate to hundredths of milliseconds. The packet 304 may also include, in the header portion 306, a sampling rate value corresponding to the rate at which the audio signal was sampled by the codec to generate the PCM data, and the header portion 306 may further include a channel value specifying the number of channels represented by the PCM data. For example, a channel value of one specifies a mono audio signal, while a channel value of two specifies a stereo audio signal.

Turning again to FIG. 2, a second codec 208 samples the audio signal 202 at a sampling rate different than the first codec 204, that sampling rate, for example, being 16 kHz. As before, a packetizer module organizes the encoded compressed data samples into packetized output 210. An audio server 212 accesses the packetized output 206, 210 to generate one or more output streams 214.

In a preferred embodiment, the audio server 212 transmits a sequence of packets in an audio output stream 214. Each output stream 214 represents the original audio signal 202 having been sampled at a particular sampling rate, such as, for example, 8 kHz or 16 kHz. It will be appreciated by those of ordinary skill that an audio transmission system may send an 8 kHz audio stream at a lower transmission bit-rate than that used to send a 16 kHz audio stream to represent the same time window of an audio signal. Thus, the 8 kHz audio stream generally uses less bandwidth during transmission than a 16 kHz audio stream representing the same audio signal.

Figure 4:
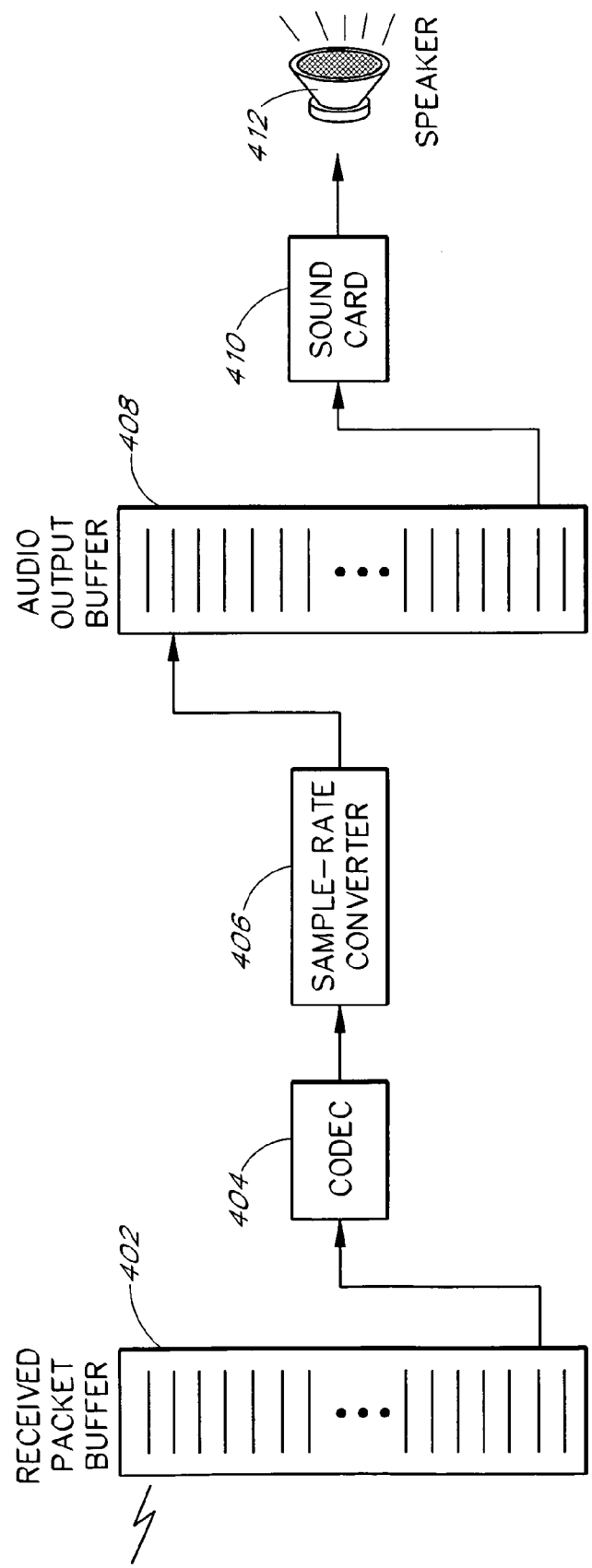
FIG. 4 illustrates components of a client computer for receiving packets of audio data and for processing those packets to recreate the original audio signal.

FIG. 4 illustrates components of the client computer 104 for receiving packets 304 of audio data and for processing those packets to recreate the original audio signal. A player module (not shown) receives audio packets 304 over the network 100, and stores those packets in a received packet buffer 402. The player module extracts the timestamp information from each packet and, in one embodiment, allocates from memory, a new timestamp data structure to hold the timestamp value for each packet received by the client computer 104. The new timestamp data structure is then linked to a linked list of timestamp structures. It will be appreciated to those of ordinary skill that other data structures could be used to hold timestamp values corresponding to each of the received packets 304.

The player module copies the earliest received packet data from the received packet buffer 402 to a codec 404. The codec 404, in one embodiment, is matched to the particular codec 204, 208 which originally encoded the data on the server computer. For example, the codec 404 decodes the data generated by the codec 204 which it sampled at 8 kHz. The codec 404, in that example, decompresses and decodes the encoded data to generate 2-s compliment 16-bit PCM data representing audio data that was sampled at 8 kHz.

In one embodiment, the codec 404 is a callable module which is passed at least two parameters when it is invoked. The first parameter is a pointer to an input buffer including the encoded audio data from a packet 304. The second parameter is a pointer to an output buffer in which the codec 404 is to place the decoded and decompressed data.

The player module calls an sample-rate converter module 406 by passing to it a pointer to a buffer of 16-bit PCM data, an origin sampling rate corresponding to the sampling rate of the audio data in the input buffer, a target sampling rate and a pointer to an output buffer in which the sample-rate converter 406 is to place resampled data. In one embodiment, the pointer to the output buffer, points to an audio output buffer 408.

The sample-rate converter 406 uses a polyphase FIR (finite impulse response) filter network to resample the data in the input buffer and to generate output data approximating the signal characteristics of the input data as if it had been sampled originally at the target sampling rate. Resampling in accordance with a polyphase FIR filter network or FIR filters with time-varying coefficients is known in the art, (see, for example, Crochiere and Rabiner, Multirate Digital Signal Processing) and it will be appreciated by those of ordinary skill that the present invention could use a different resampling method, and thus is not limited by a resampling method.

The sample-rate converter 406 generates resampled data and places it into the audio output buffer 408. To reproduce the original audio signal, the player module copies the earliest data from the audio output buffer 408 to a sound card 410 which processes the resampled data to generate sound at a speaker 412.

Advantageously, the target sampling rate provided to the sample-rate converter 406 matches the sampling rate at which the client computer 104 initialized the sound card 410. In a preferred embodiment, the sound card 410 is initialized by the client computer 104 to process audio data sampled at the highest rate that the sound card 410 can process. That target sampling rate may be 44.1 kHz in one embodiment.

Figure 5:
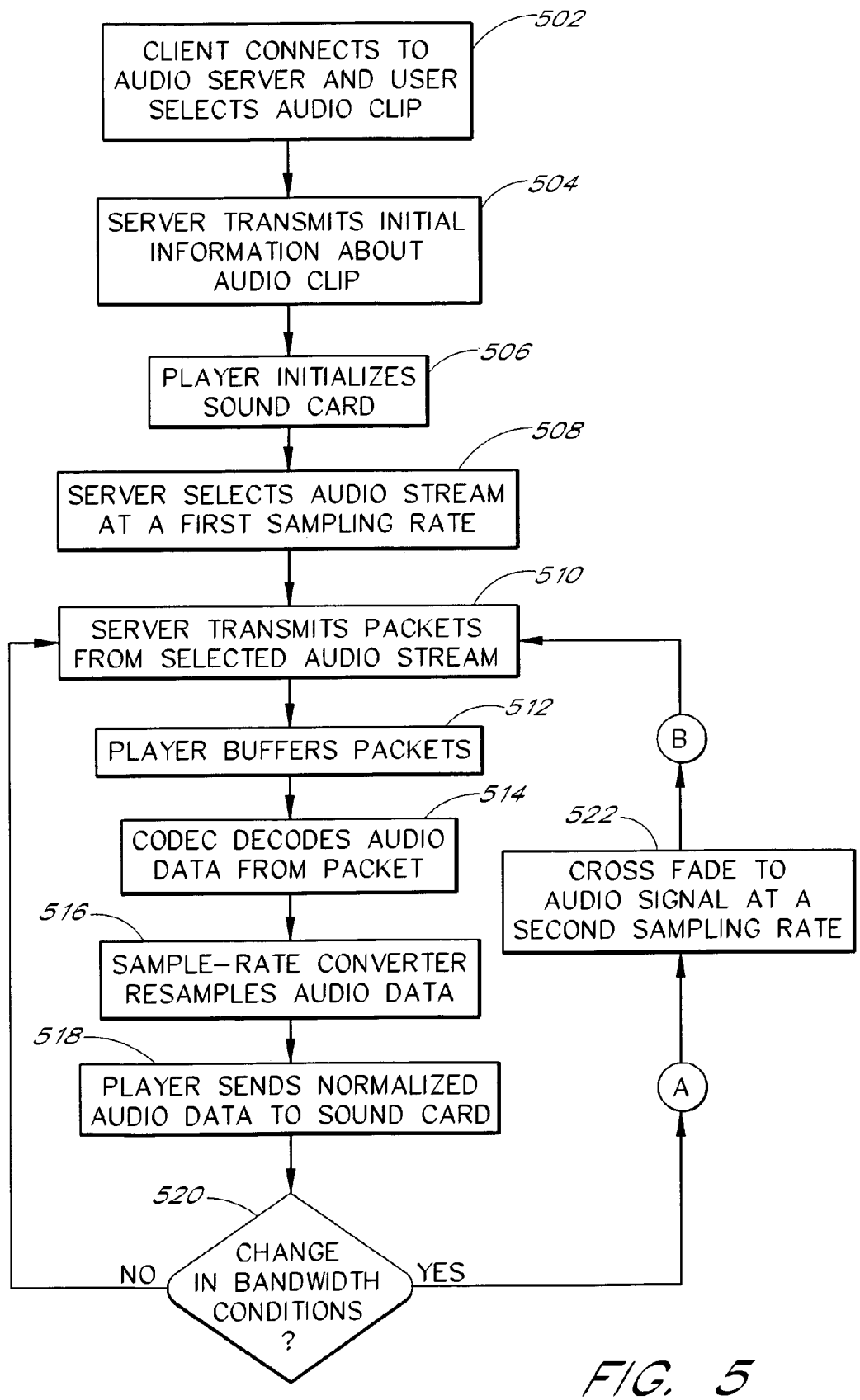
FIG. 5 illustrates steps performed in accordance with one embodiment of the present invention to perform a cross-fade between audio signals during the transmission of an audio clip.

FIG. 5 illustrates steps performed in accordance with one embodiment of the present invention to perform a cross-fade between audio signals during the transmission of an audio clip. At a first step 502, the client computer 104 establishes a network connection to the server computer 102. In one embodiment, the client computer 104 runs a web browser, such as Netscape Communicator, connects to the Internet, and issues a request for information from a web site hosting audio broadcast information. The audio server 212, running on the server computer 102, responds to the request by transmitting a web page, for example one complying with http (hypertext transport protocol), to web browser running on the client computer 104, which displays informational content from the web page to the user.

The web page may include one or more hyperlink requests for audio clips. When the user selects one of the hyperlink audio clip requests, the request is transmitted to the audio server 212 and, in a next step 504, the audio server begins transmitting initial information about the requested audio clip. The initial information may include a maximum number of channels and a maximum sampling rate at which the audio clip is available. In one embodiment, the maximum number of channels is two to correspond with stereo audio data, and the maximum sampling rate is 44.1 kHz. It will be appreciated by those of ordinary skill, that in other embodiments, the maximum sampling rate may be 48 kHz or 96 kHz or other sampling rates to correspond with professional or specialized audio equipment.

On the client computer 104, the web browser, in one embodiment, launches a player module which is implement as a web browser plug-in. In a step 506, the player module initializes the sound card 410 in accordance with the maximum channel and maximum sampling rate information transmitted by the server in the step 504.

In a further step 508, the audio server 212 selects an audio stream at a first sampling rate which corresponds to the available bandwidth in the communication link between the server computer 102 and the client computer 104. In one example, the audio server 212 selects an audio stream sampled at 8 kHz.

In a step 510, the audio server 212 begins transmitting packets from the selected audio stream. While packets may vary in size depending on the particular audio codec used and its associated audio coding frame size, in one embodiment, the packet size varies between 200 and 600 bites and includes audio data representing approximately 0.28 seconds of an audio clip.

In a further step 512, the player plug-in module buffers the packets in the received packet buffer 402. In a next step 514, the player plug-in module invokes the codec 404 to decode the audio data from the received packet buffer 402. The codec 404 decompresses the audio data into 16-bit PCM data values and places those data values into a buffer identified by a parameter to the codec module 404.

The player plug-in invokes the sample-rate converter 406, in a step 516, to normalize the sampling rate of the 16-bit PCM data, generating 16-bit PCM data samples that approximate the audio signal as if it had been sampled originally at 44.1 kHz. The sample-rate converter 406 places the resampled data into the audio output buffer 408 in accordance with an output buffer parameter passed to the sample-rate converter 406 which points to the next available location in the audio output buffer 408. It will be appreciated that the synchronization between the codec 404 and the sample-rate converter 406 may be synchronous, asynchronous, or may be event driven, and each could operate on an amount of audio data larger or smaller than that corresponding to one packet.

In a next step 518, the player plug-in sends the sampling rate normalized audio data from the audio output buffer 408, in first-in, first-out order, to the sound card 410 to recreate the original audio clip. In a step 520, a bandwidth monitoring module on the server computer 102 determines whether there is any change in the available bandwidth of the communication link between the client computer 104 and the server computer 102. Those of ordinary skill in the art will appreciate that there are many ways to detect changes in available bandwidth over a communication link, and the present invention is not limited by any such method. If, in the step 520, the bandwidth monitoring module determines that there is no change in the available bandwidth, then, processing resumes in the step 510.

If, however, in the step 520, the bandwidth monitoring module determines that the available bandwidth has substantially changed, then, in a step 522, a cross-fade is performed to switch from the current audio stream to a different audio stream sampled at a different sampling rate.

Figure 6:
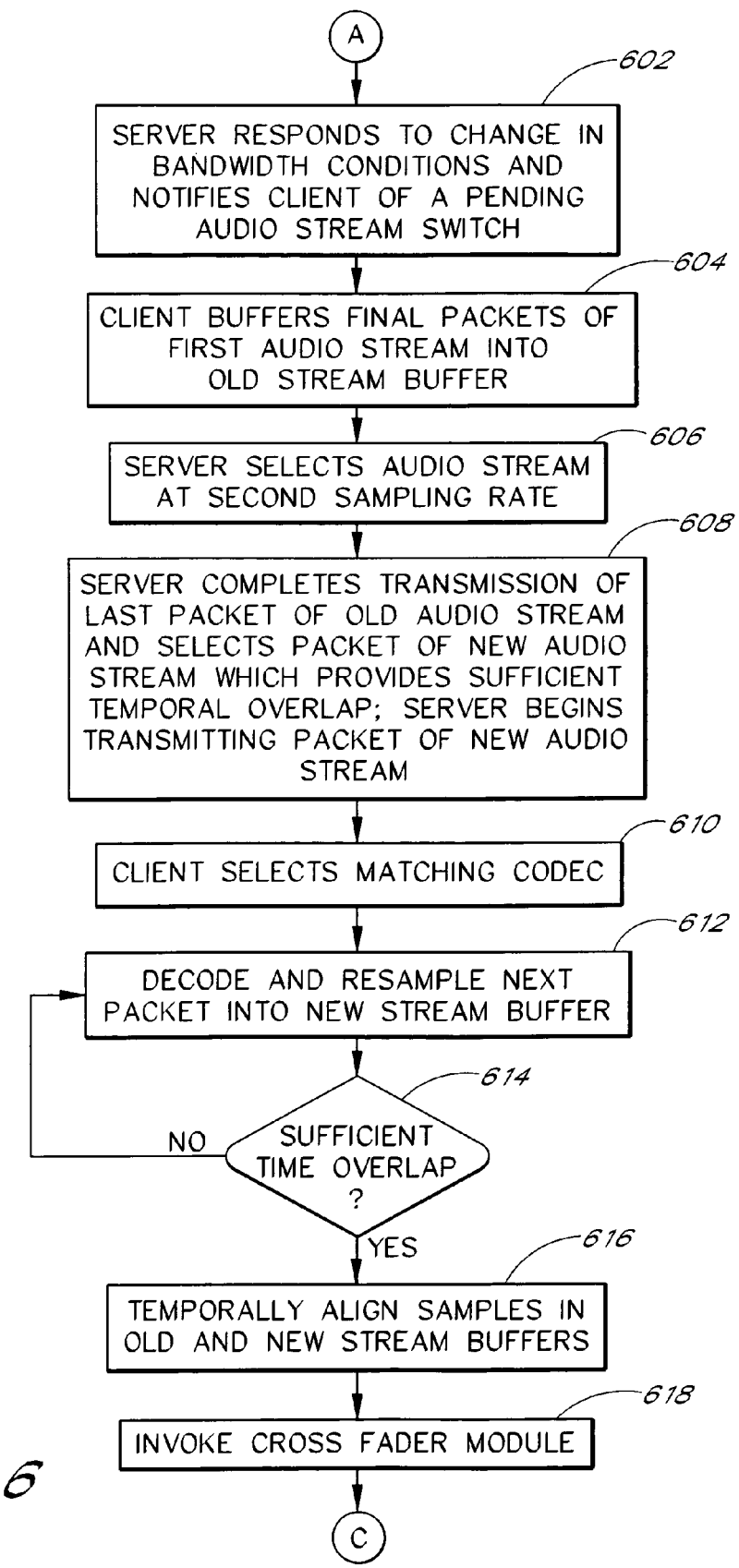
FIG. 6 illustrates steps performed in accordance with an embodiment of the present invention to perform a cross-fade from one audio stream to another audio stream sampled at a different sampling rate.

FIG. 6 illustrates steps performed in accordance with an embodiment of the present invention to perform a cross-fade from one audio stream to another audio stream sampled at a different sampling rate. In a first step 602, the audio server 212 responds to the detected change in the available bandwidth in the communication link and transmits a notification to the client computer 104 of a pending audio stream switch. In a next step 604, the player plug-in running on the client computer 104, responds to the notification of a pending audio stream switch by preparing to buffer the final packets of the current audio stream into an old stream buffer on the client computer 104.

Figure 7:
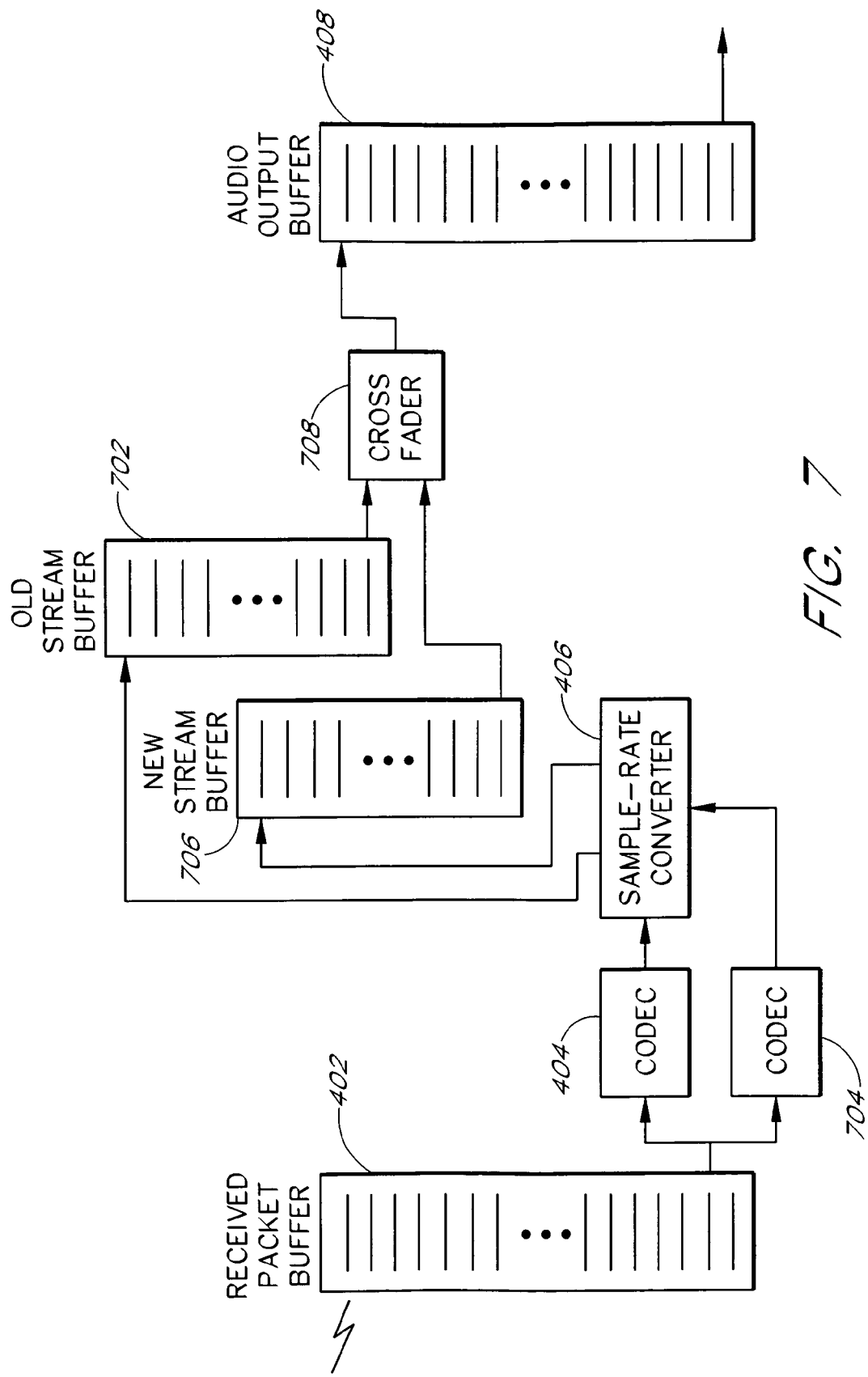
FIG. 7 illustrates components of the client computer for performing a cross-fade operation in accordance with one embodiment of the present invention.

FIG. 7 illustrates components of the client computer 104 for performing a cross-fade operation in accordance with one embodiment of the present invention. To buffer the final packets of the first audio stream, the player plug-in invokes the sample-rate converter 406 as before, but passes as a parameter, an output buffer pointer which points to an old stream buffer 702. Thus, in processing the audio data in the final packets of the current audio stream, the sample-rate converter places the sampling rate normalized data for the current audio stream into the old stream buffer 702.

Turning back to FIG. 6, the audio server 212, in the step 606, selects a new audio stream at a particular sampling rate, depending on the degree of increase or decrease in the available bandwidth of the communication link. In one example, the audio server 212 selects an audio stream sampled at 16 kHz in response to an increase in the available bandwidth in the communication link to the client computer 104.

In a next step 608, the audio server 212 completes the transmission of the last super block of the old audio stream and then locates a super block of the new audio stream which overlaps the time represented in the last super block of the old audio stream by at least 200 milliseconds. It will be appreciated that the amount of the overlap may be more or less than 200 milliseconds without substantially affecting the operation of the present invention. Thus, the present invention is not limited by any amount of overlap time.

In a next step 610, the player plug-in selects a codec which matches the sampling rate of the new audio stream. FIG. 7 illustrates a second codec 704 matched to the sampling rate of the audio data from the new audio stream. In one example, the codec 704 is matched to decode data sampled at 16 kHz. In an alternative embodiment, a single codec module may be able to decode audio data sampled at differing sampling rates.

In a further step 612, the player plug-in causes the audio data from the new audio stream to be decoded by the codec 704 and resampled by the sample-rate converter 406. The player plug-in passes as parameters to the sample-rate converter 406 a value indicating an original sampling rate of 16 kHz and also a pointer to an output buffer which points to a new stream buffer 706.

FIG. 8 illustrates data samples from a first audio stream 802 and data samples from a second audio stream 804 prior to resampling. FIG. 8 further illustrates data samples 806, 808 corresponding, respectively, to the audio samples 802, 804 after resampling. It will be noted that the resampled data samples 806 correspond to the same amount of time represented by the audio samples 802, and it will be further noted that the resampled data samples 808 correspond to the same amount of time represented by the audio data samples 804.

Thus, while prior to resampling, an amount of time t was represented by differing numbers of audio samples 802, 804 from the two audio streams, it will be appreciated that, after resampling, an identical number of audio data samples represent the period of time t for the two audio streams. It will be further appreciated that, for each resampled audio datum in one audio stream, there is, following resampling, an audio datum corresponding substantially to the same point in time for the second audio stream.

Referring again to the step 612 illustrated in FIG. 6, when the player plug-in begins the decoding and resampling of audio data for the new audio stream, it begins constructing a new linked list of timestamp structures, each corresponding to a packet from the new audio stream. Thus, by tracking the sampling rate and the start time for each packet, the player plug-in is able to quickly determine a time at which each sample in each packet is to be played.

In a next step 614, the player plug-in determines whether there is a sufficient overlap in time between the audio data in the old stream buffer 702 and the audio data in the new stream buffer 706 to permit a cross-fade operation. In one embodiment of the present invention, the player plug-in checks to see if there is at least a 200 ms overlap in time. The player plug-in determines the time corresponding to the first sample in the old stream buffer 702 and also determines the time corresponding to the last data sample in the new stream buffer 706 and determines whether the difference is equal to or exceeds 200 ms. If not, then processing resumes in the step 612. If so, then, in a next step 616, the player plug-in temporally aligns the data samples in the old stream buffer 702 and the data samples in the new stream buffer 706.

Figure 9:
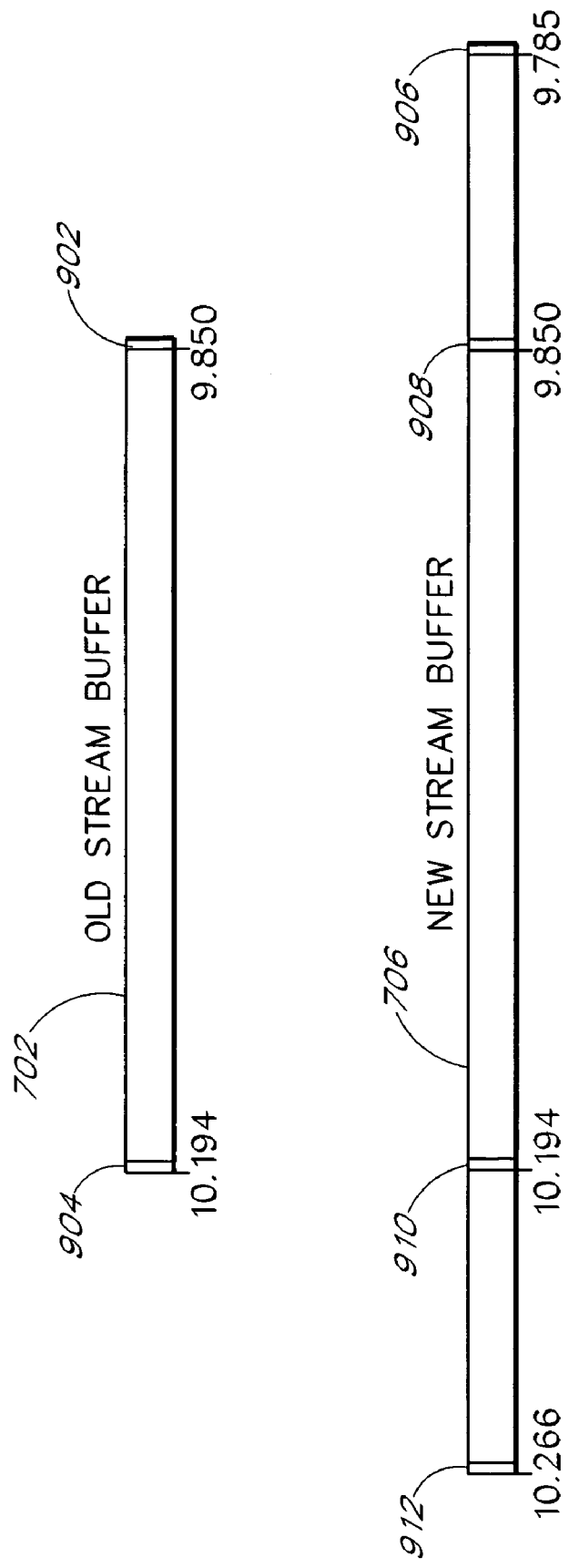
FIG. 9 illustrates the old stream buffer 702 and the new stream buffer 706 with temporal alignment points.

FIG. 9 illustrates the old stream buffer 702 and the new stream buffer 706 with temporal alignment points. A first data value 902 in the old stream buffer 702 corresponds to a time 9 seconds and 850 ms. A last data sample 904 in the old stream buffer 702 corresponds to a time of 10 seconds and 194 ms. The first sample 906 in the new stream buffer 706 corresponds to a time of 9 seconds and 785 ms. A second sample 908 in the new stream buffer 706 corresponds to a time of 9 seconds and 850 ms, and thus matches the time of the first sample 902 in the old stream buffer 702. A third sample 910 in the new stream buffer 706 corresponds to a time of 10 seconds and 194 ms. A last sample 912 in the new stream buffer 706 corresponds to a time of 10 seconds and 266 ms.

It will be appreciated that, to perform a successful and perceptually pleasing cross-fade, the data samples from the old and new streams substantially correspond in time, thus ensuring that a blending of the samples from each stream will not result in an attempt to simultaneously play two different portions of the original audio clip. It will thus be appreciated that, because there are no samples in the old stream buffer 702 that correspond to any of the samples in the new stream buffer 706 from the first sample 906 until the second sample 908, all of the samples corresponding to times earlier than 9 seconds and 850 ms are unusable in the cross-fade operation and therefore are discarded. It will further be appreciated that samples corresponding to the times from 9 seconds and 785 ms up to, but not including, 9 seconds and 850 ms are already represented by samples in the audio output buffer 408.

In the example illustrated in FIG. 9, both the old stream buffer 702 and the new stream buffer 706 include data samples corresponding in time from 9 seconds and 850 ms through 10 seconds and 194 ms. Because the time represented by those samples is greater than 200 ms—the threshold cross-fade overlap window implemented in one embodiment of the present invention—sufficient samples exist from both the old and new audio streams to perform a cross-fade. A cross-fade overlap window is defined by the time period represented by the samples from both the old stream buffer 702 and the new stream buffer 706 which correspond to all times inclusively, from 9 seconds and 850 ms through 10 seconds and 194 ms. It will be noted, that the samples in the new stream buffer 706 representing times after 10 seconds and 194 ms will be used to recreate the original audio signal, but will not be involved in the cross-fade operation, as there are no corresponding data samples in the old stream buffer 702.

Referring back to FIG. 6, in a next step 618, the player plug-in invokes a cross-fader module to perform a cross-fade of the resampled values. In one embodiment, the player passes pointers to buffers which contain the samples to be cross-faded, and those parameters may, for example, point to the old stream buffer and the new stream buffer.

Figure 10:
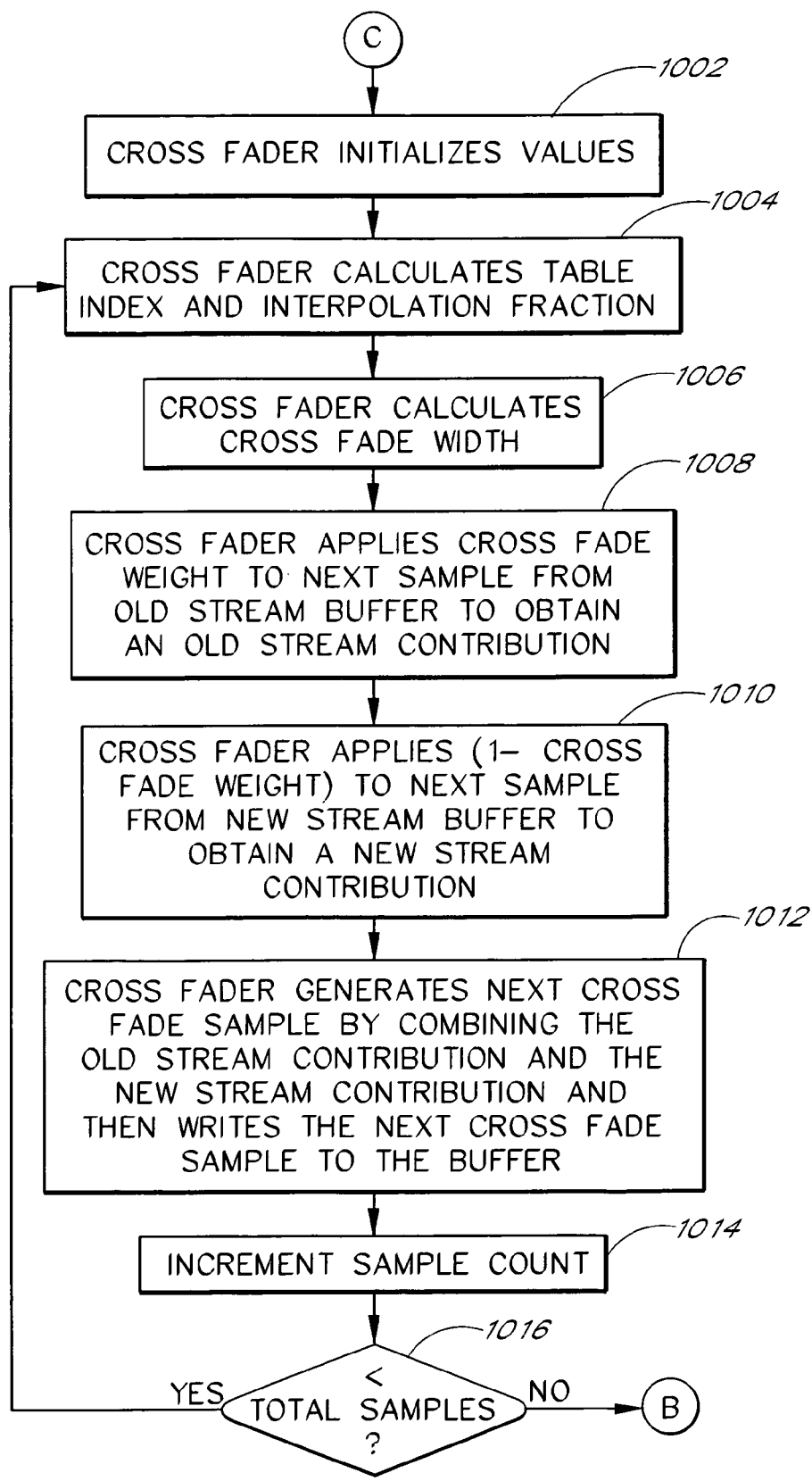
FIG. 10 illustrates steps performed in accordance with an embodiment of the present invention to cross-fade two sets of audio data samples representing the same portion of time in an audio clip.

FIG. 10 illustrates steps performed in accordance with an embodiment of the present invention to cross-fade two sets of audio data samples representing the same portion of time in an audio clip. In a first step, 1002, a cross-fader module initializes values. The initialization of certain values depends on the total number of sample pairs (one from each of the old stream buffer and the new stream buffer corresponding to the same point in time) that will be cross-faded and upon the number of slots in a cross-fade table implementing the cross-fade function.

FIG. 11 illustrates a cross-fade table 1102 providing an approximation of points along a curve 1104 derived from a cross-fade function. A graph 1106 illustrates that values along the curve 1104 range from 0 to 1 in the vertical dimension 1108. In the horizontal dimension 1110, 256 points (0 through 255) are taken from the curve 1104 and placed in the cross-fade table 1102. It will be noted, that at the first point 0 in the horizontal dimension 1110, the value along the curve 1104 is 1, while the value at point 255 along the curve 1104 is 0. Thus, in a slot 0 1112 of the cross-fade table 1102, there is placed the value 1. In slot 255 1114, there is placed the value 0. It will be thus appreciated that the 256 slots in the cross-fade table 1102 which have values taken from respective points along the curve 1104, approximate the curve 1104.

In a preferred embodiment, the function used to derive the curve 1104 is one-half cycle of the cosine function offset and scaled to begin at one (1) and end at (zero). It will be appreciated that other functions may be implemented, particularly those which plot a range of values from 0 to 1. It will further be appreciated that the cross-fade table 1102 may include fewer or more slots than 255, and will accordingly approximate the cross-fade function to a lesser or greater degree. The present invention, however, is not limited by a cross-fade function, nor is it limited by a number of slots in the cross-fade table 1102. It will be appreciated that, in one embodiment, the cross-fade table 1102 may be implemented as an array of floating point values, named cf_table[ ], and indexed from 0 to 255.

Turning back to FIG. 10, the cross-fader, in the step 1002, initializes an increment value by dividing the number of table slots, minus one, by the total number of samples. Thus, the cross-fader uses the following equation:

$$\text{increment} = (\text{table\_slots} - 1)/\text{total\_samples}$$

In a preferred embodiment, the number of table slots is 256. Thus, table_slots (set to 256) minus one is 255. As one example, the total number of sample pairs to be cross-faded might be 2,000 (e.g., total_samples is set to 2000). Thus, the increment variable would be set, in the step 1002 to 0.1275 (255/2000).

Also, in the step 1002, the cross-fader initializes a sample_count variable to 0. The sample_count variable is used to count the number of sample pairs that have been processed by the cross-fader.

In the next step 1004, the cross-fader calculates index and interpolation fraction values. To calculate the index and interpolation fraction values, the cross-fader multiplies the increment value by the sample count. Thus, the cross-fader uses the following equation:

$$\text{increment} * \text{sample\_count} = \text{index.interpolation\_fraction}$$

The index variable will correspond to an integer value resulting from the multiplication in the above equation. The interpolation reaction variable corresponds to the fractional portion of the result of the multiplication in the above equation, which follows the decimal point in the result. Thus, for example, if the result of the multiplication increment*sample_count equals 43.255, then index will equal 43, and interpolation_fraction will equal 0.255.

In a further step 1006, the cross-fader calculates the cross-fade weight to use in cross-fading two samples. In doing so, the cross-fader uses the following equation:

$$\text{cross\_fade\_weight} = \text{cf\_table}[\text{index}] - ((\text{cf\_table}[\text{index}] - \text{cf\_table}[\text{index}+1]) * \text{interpolation\_fraction})$$

In using the above equation, the cross-fader, in the step 1006, uses the cross fade table to calculate a value along the curve 1104 (FIG. 11) which corresponds to a sample pair being cross-faded. However, because the cross-fade table 1102 represents fewer points along the curve 1104 than there are samples to be cross-faded, the cross-fader uses the interpolation_fraction to perform a linear interpolation. The linear interpolation may map the sample pair being cross-faded to a value on the curve 1104 somewhere between two values in the cross-fade table 1102—a value more closely approximating the proper value along the curve 1104 for the sample pair.

Once the cross_fade_weight value is calculated, then, in a next step 1008, the cross-fader applies the cross_fade_weight to the next sample from the old stream buffer 702 to obtain an old stream contribution value. Thus, referring to FIG. 7, the cross-fader 708 accesses the next sample from the old stream buffer 702 and multiplies the value of that sample by the value of the cross_fade_weight variable, which, it will be appreciated, will be a value ranging from 1 down to 0. The cross-fader thus uses the following equation:

old_stream_contribution=old_stream_sample*cross_fade_weight

In a further step 1010, the cross-fader applies 1 minus the cross_fade_weight value to the next sample from the new stream buffer 706 to obtain a new stream contribution. To do so, the cross-fader uses the following equation:

new_stream_contribution=new_stream_sample*(1−cross_fade_weight)

To obtain the new_stream_contribution value, the cross-fader accesses the next sample value from the new stream buffer 706 and multiplies it by 1—the value of the cross_fade_weight variable in accordance with the above equation.

It will be appreciated that, in calculating the old stream contribution and the new stream contribution, the present invention applies a gradually decreasing cross-fade weight to the old stream contribution, and applies a gradually increasing cross-fade weight to derive the new stream contribution. It will further be appreciated that to cross-fade samples from the old stream buffer 702 and the new stream buffer 706, the total cross-fade weight applied always equals one. Advantageously, this maintains a consistent signal volume during the recreation of the audio signal across the duration of the cross-fade.

In a step 1012, the cross-fader generates the next cross-fade sample by combining the old stream contribution value and the new stream contribution value. Thus, in one embodiment of the present invention, the cross-fader uses the following equation:

next_cross_fade_sample=old_stream_contribution+new_stream_contribution

After summing the old_stream_contribution and new_stream_contribution values, the cross-fader writes the value (i.e., the value of the next_cross_fade_sample variable) to the audio output buffer 408. The player plug-in module will then send that value from the audio output buffer 408 to the audio card 410 for playback at the appropriate time.

In a next step 1014, the cross-fader increments the sample_count variable by one. If, in a further step 1016, the cross-fader determines that the sample_count value is less than the total number of samples to be cross-faded, then, processing resumes in the step 1004 to cross-fade additional samples. If, however, in the step 1016, the cross-fader determines that the sample_count variable is not less than the total number of sample pairs that have been cross-faded (i.e., all sample pairs corresponding to playback times in the cross-fade overlap window have been cross-faded), then, the remaining samples from the new stream buffer 706 which were not cross-faded are copied to the audio output buffer 408, and processing resumes in the step 510 (FIG. 5).

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A method comprising:
   receiving, within a first stream via a network communication link, first audio data generated by sampling of a common audio signal of an audio signal at a first sampling rate for a first time period;
   receiving thereafter, based at least in part upon a change in a bandwidth capability of the network communication link, second audio data within a second stream generated by sampling of said audio source at a second sampling rate different than said first sampling rate for a second time period, the first and second audio data corresponding to different, but overlapping, portions of the common audio signal;
   generating a plurality of samples by normalizing a portion of said first audio data to said second sampling rate, said portion of said first audio data being normalized at least in part corresponding to the overlapping portion of said common audio signal sampled at said first sampling rate;
   cross-fading and combining pairs of samples, each pair substantially corresponding to a playback time, one sample of each pair being selected from one of said plurality of samples, the other sample of each pair being selected from a portion of said second audio data, said portion of said second audio data being selected at least in part corresponding to said overlapping portion of said common audio signal sampled at said second sampling rate; and
   rendering said cross-faded and combined samples.

2. The method as defined in claim 1, wherein said cross-fading and combining includes applying a first cross-fade weight to a first sample of each of said pair of samples to obtain a first contribution, applying a second cross-fade weight to a second sample of each of said pair of samples to obtain a second contribution, and combining said first and second contributions to generate a cross-fade sample.

3. The method as recited in claim 1 further comprising storing the cross-faded combined pairs of sample on a hard disk drive.

4. A method comprising:
   receiving in a receive buffer via a network communication link first audio data of a first data stream, the first audio data representing a time period t1 and sampled at a first target sampling rate of an original audio signal;
   decoding said first audio data and re-sampling the decoded first audio data to generate first audio samples as the first audio data are received, initially into an audio output buffer, and in response to an indication of a change in a data capacity of the network communication link, into an old stream buffer instead;
   receiving thereafter in said receive buffer, second audio data from the second data stream representing a time period $t_2$ of said original audio signal and sampled at a second target sampling rate different from said first target sampling rate, said time period t1 and $t_2$ overlapping by a time period $t_3$ in said original audio signal;

decoding said second audio data and re-sampling the decoded second audio data to generate second audio samples as the second audio data are received, initially into a new stream buffer, for at least a portion of the time period $t_3$;

cross-fading each sample pair comprising corresponding sample pairs corresponding to a time within said at least a portion of the time period $t_3$ from said old and new stream buffers, by applying a first cross-fade weight to a first sample of said sample pair to obtain a first contribution, a second cross-fade weight to a second sample of said sample pair to obtain a second contribution, and by combining said first and second contributions, to successively generate a plurality of cross-faded combined samples; and outputting successively the generated cross-faded combined samples into the audio output buffer.

5. The method as described in claim 4, wherein said first stream represents said original audio signal at a first sampling rate and said second stream represents said original audio signal at a second sampling rate.

6. The method as described in claim 5, wherein each applied first cross-fade weight represents a value between 1 and 0, and the sum of said first cross-fade weight and said second cross-fade weight applied to each said sample pair is 1.

7. The method as described in claim 6, wherein each applied first cross-fade weight represents a point along a curve defined by one-half cycle of the cosine function offset and scaled to begin at a value of one and end at a value of zero.

8. A system comprising:
a receive buffer to successively receive and store a first and a second stream of an audio signal transmitted via a network, the second stream being received based at least in part upon a change in conditions of a network, the first and second streams respectively correspond to first and second portions of the audio signal, and the first and second portions audio signal overlap;
a first and a second decoder coupled with the receive buffer to respectively decode the first and second received streams;
a sample-rate converter coupled with the first and second decoders to resample the decoded first and second received streams adapted to generate a first and second plurality of digital samples respectively;
an old stream buffer coupled with the sample-rate converter to receive the first digital samples, after an initial time period, and at substantially a beginning of the receipt of a portion of the first stream corresponding to the overlap of the first and second portions of the audio signal;
a new stream buffer coupled with the sample-rate converter to receive the second digital samples for at least a portion of the second stream corresponding to the overlap of the first and second portions of the audio signal;
a cross-fader coupled with the old and new stream buffers to cross-fade and combine corresponding ones of the first and second digital samples; and
a renderer to render the cross-faded and combined digital samples.

9. The system as described in claim 8, wherein said cross-fader applies cross-fade weights to paired resampled samples from said first and second streams to generate cross-faded samples, each of said pairs of resampled samples substantially corresponding to a playback time.

10. The system as described in claim 9, wherein said cross-fader applies a first cross-fade weight to a first of each pair of said resampled samples and applies a second cross-fade weight to a second of each pair of said resampled samples, said first and second cross-fade weights summing to one.

11. The system as recited in claim 8 further comprising a receiver to receive the first and second streams from a server via the communications link.

12. A method comprising:
receiving, via a network communication link, first audio data within a first stream of an audio signal for a first time period;
receiving thereafter, via the network communication link, second audio data within a second stream of the audio signal for a second time period, said second audio data being received in response to a change in bandwidth capability of the network communication link, and having a common portion of the audio signal that is also a part of the first audio data;
decoding said first and second audio data as they are received;
generating successively pairs of samples of said first and second audio data for at least a portion of the common portion of the audio signal that is a part of the first audio data and a part of the second audio data, each pair substantially corresponding to a playback time, one sample of each pair being selected from said first decoded audio data, said other sample of each pair being selected from said second decoded audio data;
cross-fading and combining successively said successively generated pairs of samples; and
successively rendering the cross-faded and combined samples.

13. The method as recited in claim 12, wherein said first audio data's compression rate is different than said second audio data's compression rate.

14. The method as recited in claim 12, further comprising playing as an audio stream a portion of said first audio data, said cross-faded pairs of samples and said portion of said second audio data.

15. The method as recited in claim 12, wherein said first audio source is pre-recorded music.

16. The method as recited in claim 12 wherein the first and second audio data are received from a server via the communications link.

17. A computer readable media having a set of instructions adapted to enable a processing system to practice a method including:
receiving via a communication link first audio data within a first audio stream of an audio signal for a first time period;
receiving thereafter, a second audio data within a second stream of the audio signal, via the communication link, for a second time period, in response to a change in bandwidth capability of the network communication link;
decoding said first and second audio data, the first and second data, both having a common portion of the audio signal; and
generating pairs of samples of said first and second audio data for at least a portion of the common portion of the audio signal, each pair substantially corresponding to a playback time, one sample of each pair being selected from a portion of said first decoded audio data, said other sample of each pair being selected from a portion of said second decoded audio data;

cross-fading to combine said pairs of samples; and rendering the cross-faded and combined samples.

18. The computer readable media as recited in claim 17, wherein said first audio data is generated via encoding of the common audio signal at a first sampling rate and said second audio data is generated via encoding of the common audio signal at a second sampling rate, wherein said first sampling rate is different than said second sampling rate.

19. The computer readable media as recited in claim 17, further comprising playing as an audio stream a portion of said first audio data, said cross-faded combined pairs of samples, and a portion of said second audio data.

20. A method comprising streaming first audio data to a remote rendering client device for a first period of time, the first audio data having been generated by sampling a first portion of an audio signal at a first sampling rate;

detecting a change in operating condition; and streaming second audio data to the remote rendering client device for a second period of time, the second audio data having been generated by sampling a second portion of the audio signal at a second sampling rate, the first and second portions of the audio signal having a common portion of the audio signal.

21. The method of claim 20, wherein the method further comprises sampling the first portion of the audio signal at the first sampling rate to generate the first audio data, and the streaming of the first audio data is performed as the first audio data are generated.

22. The method of claim 20, wherein the change in operating condition comprises a change in bandwidth of a communication link to the remote rendering client device.

23. The method of claim 20, wherein the method further comprises pre-notifying the remote rendering client device of the change in the generating sampling rate of the audio data being streamed to the remote rendering client device.

24. An apparatus comprising streaming means for streaming audio data generated from sampling an audio signal at a sampling rate to a remote rendering client device; and control means for first controlling the streaming means to stream first audio data to the remote rendering client device for a first period of time, the first audio data having been generated by sampling a first portion of the audio signal at a first sampling rate, and then on detecting a change in operating condition, controlling the streaming means to stream thereafter, second audio data to the remote rendering client device for a second period of time, the second audio data having been generated by sampling a second portion of the audio signal at a second sampling rate, the first and second portions of the audio signal having a common portion of the audio signal.

25. The apparatus of claim 24, wherein the apparatus further comprises sampling means for sampling the first portion of the audio signal at the first sampling rate to generate the first audio data, and sampling the second portion of the audio signal at the second sampling rate to generate the second audio data.

26. The apparatus of claim 24, wherein the apparatus further comprises detection means to detect the change in operating condition, the change being a change in bandwidth of a communication link to the remote rendering client device.

27. The apparatus of claim 24, wherein the apparatus further comprises pre-notification means for pre-notifying the remote rendering client device of the change in the generating sampling rate of the audio data being streamed to the remote rendering client device.

\* \* \* \* \*

UNITED STATES PATENT AND TRADEMARK OFFICE
CERTIFICATE OF CORRECTION

PATENT NO. : 7,302,396 B1 Page 1 of 1
APPLICATION NO. : 09/300798
DATED : November 27, 2007
INVENTOR(S) : Kenneth E. Cooke It is certified that error appears in the above-identified patent and that said Letters Patent is hereby corrected as shown below:

Column 10, Line 57, "interpolation reaction" should be changed to --interpolation_fraction--.

Signed and Sealed this

Twentieth Day of January, 2009

JON W. DUDAS
*Director of the United States Patent and Trademark Office*